US011775661B2

(12) United States Patent
Nair

(10) Patent No.: US 11,775,661 B2
(45) Date of Patent: Oct. 3, 2023

(54) LIMITING DEVICE FUNCTIONALITY BASED ON DATA DETECTION AND PROCESSING

(71) Applicant: PAYPAL, INC., San Jose, CA (US)

(72) Inventor: Rahul Nair, Leander, TX (US)

(73) Assignee: PAYPAL, INC., San Jose, CA (US)

( * ) Notice: Subject to any disclaimer, the term of this patent is extended or adjusted under 35 U.S.C. 154(b) by 178 days.

(21) Appl. No.: 17/235,504

(22) Filed: Apr. 20, 2021

(65) Prior Publication Data
US 2021/0248249 A1 Aug. 12, 2021

Related U.S. Application Data

(63) Continuation of application No. 15/976,679, filed on May 10, 2018, now Pat. No. 10,984,120.

(51) Int. Cl.
G06F 21/62 (2013.01)
H04L 9/40 (2022.01)
H04W 12/64 (2021.01)

(52) U.S. Cl.
CPC ............ G06F 21/62 (2013.01); H04L 63/107 (2013.01); H04W 12/64 (2021.01); G06F 2221/2111 (2013.01)

(58) Field of Classification Search
CPC ............ G06F 21/62; G06F 2221/2111; H04W 12/64; H04L 63/107
See application file for complete search history.

(56) References Cited

U.S. PATENT DOCUMENTS

| 9,088,560 | B1 | 7/2015 | Newstadt et al. |
| 9,275,234 | B2 | 3/2016 | McGloin et al. |
| 9,313,211 | B1 | 4/2016 | Lototskiy |
| 9,386,042 | B1 | 7/2016 | Stoner et al. |
| 9,536,057 | B2 | 1/2017 | Das et al. |
| 9,565,196 | B1 | 2/2017 | Botti et al. |
| 9,727,747 | B1 | 8/2017 | Kim et al. |
| 10,275,607 | B2 | 4/2019 | Kim et al. |
| 2002/0125886 | A1 | 9/2002 | Bates et al. |
| 2010/0100972 | A1 | 4/2010 | Lemieux et al. |
| 2011/0191862 | A1 | 8/2011 | Mandava et al. |
| 2012/0238257 | A1 | 9/2012 | Anson |
| 2013/0254831 | A1 | 9/2013 | Roach et al. |
| 2014/0020068 | A1 | 1/2014 | Desai et al. |
| 2015/0074763 | A1 | 3/2015 | Schwartz et al. |

(Continued)

Primary Examiner — Hee K Song
(74) Attorney, Agent, or Firm — Haynes and Boone, LLP

(57) ABSTRACT

There are provided systems and methods for limiting device functionality based on data detection and processing. A user computing device may include sensitive or confidential data and/or processes that utilize such data that a malicious party may wish to abuse, such as an electronic transaction processing application that uses financial data of a user. The device may therefore be compromised by the malicious party if the device becomes accessible to that party. The device may utilize one or more processes to detect device data determine data proximate to the device and/or contextual data in order to determine whether limitations on application processes are required based on the potential nearby risk. If the nearby risk indicates the device application processes may be in danger, the device may impose limitations on the processes and/or wipe data. The device may also alert other devices or nearby users.

20 Claims, 7 Drawing Sheets

(56) References Cited

U.S. PATENT DOCUMENTS

| | | |
|---|---|---|
| 2015/0121515 A1 | 4/2015 | Aratsu et al. |
| 2015/0296074 A1 | 10/2015 | Shah et al. |
| 2016/0226911 A1 | 8/2016 | Boss et al. |
| 2016/0242143 A1* | 8/2016 | Lotter .................. H04W 8/005 |
| 2016/0314308 A1 | 10/2016 | Suzuki et al. |
| 2016/0366152 A1 | 12/2016 | Jackson et al. |
| 2017/0075740 A1 | 3/2017 | Breaux et al. |
| 2018/0007558 A1 | 1/2018 | Maragoudakis |
| 2018/0018470 A1 | 1/2018 | Aggarwal et al. |
| 2018/0211248 A1* | 7/2018 | Sims .................. G06Q 20/3221 |
| 2018/0286161 A1 | 10/2018 | Yorifuji et al. |
| 2019/0012458 A1 | 1/2019 | Fausak et al. |
| 2019/0306117 A1 | 10/2019 | Cudak et al. |

\* cited by examiner

LIMITING DEVICE FUNCTIONALITY BASED ON DATA DETECTION AND PROCESSING

CROSS-REFERENCE TO RELATED APPLICATIONS

This application is a continuation of U.S. application Ser. No. 15/976,679, filed May 10, 2018, which is incorporated herein by reference in its entirety.

TECHNICAL FIELD

The present application generally relates to limiting device functionality based on device vulnerabilities and risk and more specifically to processing device data and/or location data to limit application processes, data availability, and/or application usage.

BACKGROUND

A computing device may include one or more applications that have and/or use confidential or sensitive data, including a digital wallet application that accesses and utilizes a digital wallet for a user. This data may present vulnerabilities to a user associated with the device, such as an owner of the device. For example, the digital wallet application may utilize a digital wallet for the user to electronically process transactions with other devices using the user's personal and/or financial information, a digital token associated with the digital wallet, and/or other sensitive data accessible through the device. Thus, if the device is stolen or misappropriated, or the device suffers from hardware or software vulnerabilities, sensitive data accessible through the device may also become accessible to a malicious party or the device may be used for fraudulent means.

Figure 1:
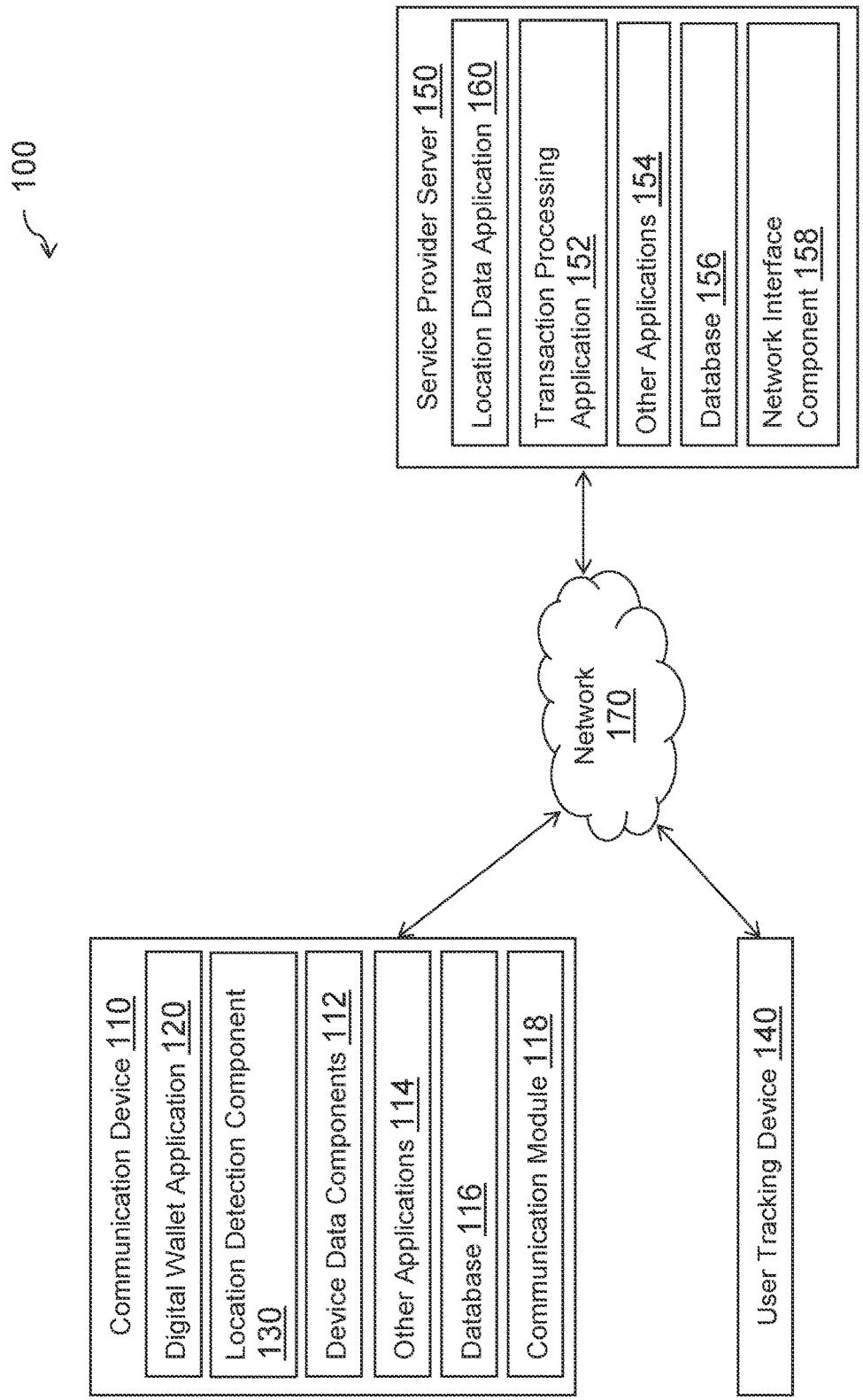
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for limiting device functionality based on data detection and processing. Systems suitable for practicing methods of the present disclosure are also provided.

A user computing device, such as a mobile smart phone, tablet computer, and/or personal computer, may include confidential, sensitive, or secure data and/or processes that may open the device and/or a user associated with the device to fraud, vulnerabilities, or other malicious behavior by another party if the device becomes compromised and the data/processes are available for use by the other party. The user computing device may implement security settings that impose limitations on device functionality and/or access to the data based on detected data on the device, nearby data of events, users, or other context associated with the device, or other data detectable by the device. If the user computing device detects data that imposes a risk to the data/processes that cause vulnerabilities to the device/user, the device may determine whether the risk violates any security settings that impose the limitation on device functionality (e.g., application processes) and/or access to the data. If a security setting is violated, the user computing device may apply the limitation to the device, application, data, or other device process/data. The user computing device may allow the limitation to be lifted through user authentication, and may automatically reverse or remove the limitation if the device data and/or proximate data to the device indicates the risk is no longer present.

In this regard, a user device may include one or more applications that utilize confidential or sensitive data stored on the user device or accessible by the user device using the application(s). For example, this data may include user personal and/or financial information, which may be utilized by application processes for user identification and/or electronic transaction processing. The data may also include authentication credentials and/or digital tokens that authenticate the user and/or device. Other types of sensitive or confidential data may also include health or legal data, user contact data and/or contact data for other users, emails, texts, and other communications, as well as other types of data a user wishes to maintain as a secret and secure from other users. Applications may utilize this data in the normal course of operation of the application, which may be processed, sent, received, or otherwise utilized by one or more applications processes. Thus, if the user device becomes compromised either physically or electronically (e.g., through a hardware or software vulnerability), this data may become compromised. The device may therefore include safeguards to prevent access to the data in the event of potential risk of the data becoming compromised. Since particular application processes may also be required to be secured to prevent compromising of secure data on the device, the device may also implement limitations on application processes and/or device functionality to prevent data theft.

Device data and/or application processes that an owner of the user device and/or data/processes would like to secure from theft or malicious use may include a digital wallet associated with an account used by a user with an online transaction processing service, such as PayPal®. A service provider may provide an account where a user may establish a digital wallet of authorized financial resources used to conduct electronic transaction processing. The user may be required to provide identification information to establish the account, such as personal information for a user, business or merchant information for an entity, or other types of identification information including a name, address, and/or other information. The user may also be required to provide financial information, including payment card (e.g., credit/debit card) information, bank account information, gift card information, and/or benefits/incentives, which may be used to provide or receive funds. In order to create an account, the user may be required to select an account name and/or provide authentication credentials, such as a password, personal identification number (PIN), answers to security questions, and/or other authentication information. Furthermore, the service provider may provide digital wallet services, which may offer financial services to send, store, and receive money, process financial instruments, and/or provide transaction histories. Once an account is created, the user's personal and/or financial information may be used to generate a digital wallet used for electronic transaction processing through the account. A token associated with the digital wallet may be issued to the device of the user, where the token may include data (which may be encrypted) allowing the service provider to identify the user and authenticate the user. In other embodiments, other types of service providers, applications, online transaction processors, social networking and/or social posting/microblogging platforms, or other entities may provide secure data that is stored on the user device and/or accessible to the user device.

In order to determine whether the user device is to implement processes to limit access to device data and/or application processes, the device may detect device data for the device, proximate data to the device, and/or contextual data associated with the device in real-time. Proximate data nearby the device may include real-world data associated with a device location (e.g., a geo-location for the device determined by the device through a component, such as a GPS locator), geographic area, or distance around the device. The data may be associated with events, or may be determined using other information for the location or area, such as statistical information, nearby user information, merchant information, available network connection information, connected or nearby device information, or other information associated with the device location.

The proximate data may be determined by the device, for example, using wireless communications to communicate with a router to determine a number of nearby devices connected to the router, unknown nearby devices, or other nearby device data. The proximate data may also be detected by the user device based on another device associated with an owner of the user device, for example, through a connection with the other device to determine that the owner is in proximity to the user device. The proximate data may also be determined using a remote online resource, such as a publically available application programming interface (API) or a public server or device (e.g., a database (DB)) that provides data associated with a location, including crime events or statistics, nearby user information, nearby device information, merchant information for a merchant associated with the location, activity or other events nearby the device, and/or account activity associated with an account used or accessible by the device. The API or DB may also be private, which may be accessible through a secure application on the device that performs device data and process management, such as a private API or DB of an entity that provides device management or control based on risk associated with the current operation of the device. Thus, in response to determining a device location, the user device may further detect nearby information for the device and/or access an online resource to determine data for events, users, or other information proximate to the user device for use in determining potential or actual device vulnerabilities.

Thus, data or nearby information or events may indicate that the user device is compromised or at risk of becoming compromised. On-device data detectable by the device may also indicate possible or actual vulnerabilities that require securing device data and/or processes. The user device may determine device data that indicates whether the device, data stored on the device, and/or application processes or device functionality is at risk of becoming compromised through the device's software and/or hardware. For example, software, including operating system software, may become vulnerable through malware, viruses, keyloggers, or other types of malicious third party programs. The software vulnerability may also correspond to a known vulnerability by the software that requires an update patch to remedy. Thus, a virus scan or software/operating system version may be used to determine a known vulnerability, or a time since a virus scan or software, firmware, or other system update may indicate increase likelihood of a vulnerability or risk to system vulnerabilities.

Actions taken with the device may indicate risk to vulnerabilities and/or compromising of device data/processes. For example, powering off the device in a new location, removing a subscriber identity module (SIM) card, and/or placing the device in an environment or device that prevents communications (e.g., Faraday cage) are some exemplary actions. In other embodiments, multiple failed authentications may also indicate a potential vulnerability to an unknown user attempting to access the device. Hardware of the device may also present potential vulnerabilities or risk, such as a disabled component of the device, a damaged component of the device, or a removed component of the device. The device may also detect unauthorized or irregular use of an application, for example, use of an application when a user is normally asleep or otherwise occupied. Thus, contextual data may also be processed with the data of information/events proximate to the device and/or device vulnerabilities or security issues. Contextual data may correspond to data that is detectable by the device and/or determined using a component of the device and may provide contextual information used to process other data types (e.g., proximate data or on-device data) to determine whether that data indicates a potential or actual risk or vulnerability. Contextual data may therefore include information such as a time, a number or regularity of an occurrence, a number of nearby users, or other information.

Based on the aforementioned data, the user device may then determine whether a limitation on device functionality (e.g., application processes and/or access to secure data) is required. Limitations that may be imposed on device functionality may include partial or complete limitations. For example, a partial limitation may prevent certain applications from accessing specific data and/or utilizing certain processes, or may limit the extent that the data and/or processes may be used. In an electronic transaction processing application, such as a payment application provided by PayPal®, a partial limitation on electronic transaction processing, digital wallet usage, or other data processing/usage may limit the amount of funds a digital wallet may use to process a transaction, such as a $100 limit on transaction processing when the limitation is applied. The partial limitation may therefore allow partial access to an application, application process, and/or data. Conversely, a complete limitation may prevent entire access to an application, application process, and/or data. For example, a complete limitation may prevent access to the payment application and/or use of the user's digital wallet in the payment application. A limitation may also include an application or system process executable in response to the detected risk or vulnerability. For example, a limitation may lock an application and/or freeze a digital wallet, and in response to the imposed limitations on the application and/or data, the limitation may further implement processes including a data destruction process and timer, sounding an alarm on the user device and/or outputting a display screen output (e.g., blinking light, notification, etc.), and/or activating a camera or microphone to capture sounds or images of the environment around the user device. The limitation may also execute a process to alert another device, such as a device of a known contact or another device of the user (e.g., a wearable device), or a device/server of an authority figure, such as the police.

Thus, the user device may access pre-set limitation settings and/or user configured limitation settings in response to detection of proximate data associated with events/users/information nearby the device and/or on-device data determined by the device. The limitation may be determined based on the particular data that causes activation of the limitation. For example, the data may indicate a particular geo-location, a geographic area (e.g., a city, zip-code, geo-fenced area), or a distance around the user device.

The data may indicate a distance from the user device that an event occurs, a user is located (e.g., a suspicious or unknown user or a known criminal). The data may also indicate a location of a merchant, a number of login or authentication attempts, and/or a use of a device application. Thus, the data may activate a limitation based on meeting or exceeding an allowable setting for the limitation (e.g., the number of nearby crime reports, the crime rating of the location, the distance from the suspicious activity, the merchant, etc.). The limitation may therefore be associated with pre-set or user generated settings that cause activation of a limitation. Pre-set settings that cause activation of a limitation may come standard with an operating system and/or specific application, and cause the device to implement a limitation to secure device data and/or processes based on the proximate, on-device, and/or contextual data meeting or exceeding a setting amount, distance, number, or other quantitative measurement. The user may also configure data and/or processes to be limited based on user established setting data measurements, where a user selected limitation may be imposed when the determined data by the user device meets or exceeds this user setting. A user, such as an owner of the device, may establish these user limitation settings using one or more control panels, which may allow configuration of the limitation that is imposed on data/processes and the required data measurement that causes implementation of the limitation. The device may also utilize a combination of factors or measurements when determining the limitation and/or multiple limitations to activate or implement when the data is determined by the user device. In various embodiments, the determination by the user device of the limitation may be based on risk, as well as risk factors and acceptable risk levels. For example, a risk calculation or score may be determined, which may be used to determine whether the risk exceeds a threshold risk tolerance or allowable score. Based on the determination, a limitation on device data or processes may be implemented.

Once the limitation or other adjustment or change to device data and/or processes (e.g., functionality) is determined, the user device may implement the limitation through one or more processes that cause the device data and/or processes at risk of fraud, misappropriation, or other malicious use to limit access and/or use to the data/processes. The limitation may be implemented based on the settings, for example, when the specific proximate and/or on-device data is met, and may further be implemented based on the requirements of the settings, such as the length of limiting the access/use of the data/processes, necessary alerts transmitted or output when processing the limitation, and/or data capture processes of an environment around the device when implementing the limitation. The settings for the limitation may therefore dictate how the limitation is generated, processed, and implemented. The settings may be used to generate and/or determine one or more pre-stored processes to implement the settings, which may correspond to executable code that causes the limitation to protect and/or limit access to the device's data and/or application processes. The processes of the user device to execute the limitation and/or associated alerts, device procedures (e.g., a system wipe or a wipe of particular data and/or application processes), and/or data capture may be pre-set by the device processes that establish the limitation settings or may be configurable by the owner or user of the device after creating a limitation setting. Once determined, the device may execute the process(es) to implement the limitation based on the settings for that limitation.

In various embodiments, a limitation setting may be utilized to limit access to and/or electronic transaction processing using a digital wallet stored on the device and/or accessible by an application of the device based on criminal activity, suspicious users, and/or crime rate within a geographic area or proximity range associated with the user device. The user device may then prevent use of the digital wallet or impose a maximum amount for processing using the digital wallet (e.g., $100) when a crime is detected nearby, a suspicious user or criminal is nearby, or the crime rate exceeds a threshold for the geographic area. Another limitation setting for the user device's data/processes may limit digital wallet spending amounts based on the merchant at the location of the device and/or engaged in electronic transaction processing with the device. Unsuccessful login or authentication attempts to the user device or an application of the user device may limit the amount usable with the digital wallet or may entirely block the digital wallet from use if the number of attempts meets or exceeds a threshold.

The user device may also detect a proximity of a specific user, such as an owner, to the user device, and may alter allowable spend, wallet access, and/or other data/processes based on the proximity of the user to the device or the distance that the user is from the device. Such determination may be made by pinging a wearable computing device, such as an activity tracker, wristwatch, or eyeglasses using short range wireless communications and using a received signal strength indicator (RSSI) to determine a distance from the device. Other types of data used to implement a limitation setting on the user device may include a number of Wi-Fi connections to a router connected to the device, for example, if several new, unknown, or uncommonly located devices at the location are detected by the Wi-Fi router. A limitation setting may also be activated based on suspicious or irregular activities or events nearby, such as if a door is opened at the device owner's home past a specific time, which may be detected using one or more sensors and/or smart home technology, or if an application on the user device is accessed or utilized at an uncommon time.

The user device may also reverse the limitation implemented on the user device's data/processes. Once the risk is no longer present, as detected based on the proximate and/or on-device data, the user device may then allow access to the data/processes previously restricted, and may remove any such limitations, such as through user authentication by biometrics or passcode. The detected data by the device may also be used to adjust one or more limitations presently imposed on the user device, for example, by increasing the protective measures taken to secure data or processes or by reducing the limitations to allow an increase in the allowable usage or access to the data/processes previously limited by the user device.

In this regard, a user device may protect from theft, misappropriation of data, and/or fraudulent usage by detecting device data (e.g., data proximate to the device and/or on-device data) through a data detection component and limiting access to and/or usage of particular data, applications, and/or executable processes based on settings established for the detected data. This allows a user device and/or data on the user device to be protected from malicious parties without requiring active input to the device that causes the device to lock data or processes, wipe data, and/or output notifications. Thus, these malicious parties may be prevented from utilizing the device and in environments where the device may normally not be limited by commands from a remote device or server that protects the device. The device may therefore provide improved data and device usage security.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a user tracking device 140, and a service provider server 150 in communication over a network 170. A user (not shown) may utilize communication device 110 to utilize the various features available for communication device 110, which may include processes and/or applications that may utilize and/or have access to confidential or sensitive data that the user may wish to secure. Communication device 110 may detect device data, such as proximate data and/or on-device data during use. For example, communication device 110 may detect a distance to the user through user tracking device 140. In one embodiment, "proximate" can be a distance determined by a service provider associated with the device or an application on the device and may vary depending on a location of the device. For example, in a more rural or less densely populated area, the distance may be greater than in a more urban or more densely populated area. The distance may also depend on the time (e.g., a shorter distance in the middle of the night vs. a longer distance in the middle of the day) or type of location (e.g., shorter distance in a high crime area vs. longer distance in a lower crime area). Communication device 110 may also determine proximate data through service provider server 150, such as data of events, users, occurrences, and/or other devices associated with a location determined by communication device 110. Using the determined data, communication device may execute one or more processes to generate or determine a limitation on the data or processes available through communication device 110, for example, based on settings to implement limitations. The limitation may be implemented based on the determined device data, and may be removed or changed based on further detected data.

Communication device 110, user tracking device 140, and service provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented as a communication device that may utilize appropriate hardware and software configured for wired and/or wireless communication with user tracking device 140 and/or service provider server 150. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a digital wallet application 120, a location detection component 130, device data components 112, other applications 114, a database 116, and a communication module 118. Digital wallet application 120 and other applications 114 may correspond to executable processes, procedures, and/or applications with associated hardware. In other embodiments, communication device 110 may include additional or different modules having specialized hardware and/or software as required.

Digital wallet application 120 may correspond to one or more processes to execute modules and associated software/hardware of communication device 110 to establish an account with service provider server 150, which may include generating a digital wallet having data used for electronic transaction processing, and limit use of the account/digital wallet and/or access to data for the account/digital wallet based on detected device data. In this regard, digital wallet application 120 may correspond to specialized software utilized by communication device 110 to provide an interface to permit the user to enter input and other data for an account, including a personal or shared account. The data may be input through an input device (e.g., touch screen with a graphical user interface) displayed by digital wallet application 120, keypad/keyboard, mouse, etc.) and/or through a data capture device (e.g., scanner, camera, other optical device, etc.). Information for an account may include data necessary to establish the account, including personal and/or financial data for a personal account and/or device identifiers for a linked device, such as user tracking device 140. A personal account accessible through digital wallet application 120 may be used to initiate, receive, and/or process/complete transactions using services provided by service provider server 150, which may include accessing and using sensitive or confidential data. Once entered, the account data may be communicated to service provider server 150 over network 170 by digital wallet application 120 for establishment and maintenance of the account.

Digital wallet application 120 may correspond to a general browser application configured to retrieve, present, and communicate information over the Internet (e.g., utilize resources on the World Wide Web) or a private network. For example, digital wallet application 120 may provide a web browser, which may send and receive information over network 170, including retrieving website information, presenting the website information to the user, and/or communicating information to the website, including payment information. However, in other embodiments, digital wallet application 120 may include a dedicated application of service provider server 150 or other entity (e.g., a merchant), which may be configured to assist in processing purchase requests. Moreover, in other embodiments, service provider server 150 may not perform transaction processing, and may instead correspond to another service provider, where digital wallet application 120 may include processes to access and utilize services provided by such a service provider, for example, the one or more of processes described herein. For example, digital wallet application 120 may correspond to other types of applications that may include and/or use data/processes that a user may wish to secure, including social networking or media applications, contact list applications, messaging or email applications, or other device application.

Where the account established by digital wallet application 120 corresponds to a private or personal account for a user, digital wallet application 120 may be implemented as a user interface enabling the user to enter payment instruments for use in a digital wallet that provides transaction processing services. Digital wallet application 120 may be utilized to select payment instrument(s) for use during a transaction between the user and another entity, including one associated with service provider server 150. Digital wallet application 120 may utilize the digital wallet and/or user financial information for the personal account, such as a credit card, bank account, or other financial account, as a payment instrument when processing a transaction and/or transferring funds. Digital wallet application 120 may be utilized to view the results of the transaction and/or for viewing and storage of a transaction history, such as a receipt.

Communication device 110 may further be capable of detecting device data associated with communication device 110 using location detection component 130 and/or device data components 112, including data for events, users, and/or devices in proximity to communication device 110 and/or on-device data of processes, data, or events currently being processed, executed, or determined on communication device 110, as discussed herein. Digital wallet application 120 may utilize the determined data to implement one or more limitations on digital wallet application 120 based on setting for those limitations, for example, settings to impose limitations on processes or available data accessible through digital wallet application 120. A limitation may impose a partial restriction or complete block on access and/or use of particular processes and/or data available to digital wallet application 120, or may entirely block use of digital wallet application 120. Thus, a limitation corresponds to an executable process to prevent partial or complete access/usage of digital wallet application 120 when the limitation is executed. The limitation may also be set with further processes to be executed when a setting for the limitation is met or exceeded. For example, another device may receive an alert from communication device 110 of the detected data and the executed limitation, or a notification may be output through a speaker or a display screen of communication device 110. Digital wallet application 120 may also implement a process to wipe data, reset or deactivate communication device 110, lock communication device 110, and/or capture data nearby communication device 110 (e.g., through a camera, microphone, and/or input component, such as a biometric capture device).

Digital wallet application 120 may allow for a user, such as an owner of communication device 110, to establish settings that cause a limitation to be implemented based on detected device data. The settings may correspond to a proximity range within which the device data may be required to be detected. The settings may also correspond to a threshold level, number, or acceptable risk, which, when met or exceeded, cause the limitation to be imposed on digital wallet application 120. For example, a setting may include a maximum or minimum number of nearby events, users, or other measurable quantity. In one embodiment, "nearby" can be within a distance determined by a service provider associated with the device or an application on the device and may vary depending on a location of the device. For example, in a more rural or less densely populated area, the distance may be greater than in a more urban or more densely populated area. The distance may also depend on the time (e.g., a shorter distance in the middle of the night vs. a longer distance in the middle of the day) or type of location (e.g., shorter distance in a high crime area vs. longer distance in a lower crime area). The setting may also be used to determine acceptable number or type of device actions, such as failed authentication attempts and/or application access/use. The settings may also dictate the contextual data that may be required to be detected with the device data, such as a time of day or other context. Once the setting requirements for a limitation have been met, digital wallet application 120 may execute a process to implement the limitation by imposing the required limits on digital wallet application 120 and/or executing the additional processes. Moreover, digital wallet application 120 may also remove the limits once the data is no longer detected, a user authenticates themselves and requests removal of the limitation, and/or other device data is detected that causes removal of the limitation (e.g., the owner or authorized user being within a certain distance of communication device 110).

Location detection component 130 corresponds to a hardware and/or software feature of communication device 110 that assists in detecting a location of communication device 110, for example, through a GPS locator and service, triangulation process, mapping application, check-in process/feature, short range wireless communications, or other location detection process. Location detection component 130 may be used to determine a location of communication device 110, which may be utilized to determine, retrieve, or detect other device data, including contextual data, proximate data, and/or on-device or nearby device data. Location detection component 130 may provide a location to and/or be accessed and utilized by digital wallet application 120 when detecting device data to determine any limitations that may be required to be imposed on data or processes utilized by or accessible through communication device 110. Moreover, the location for communication device 110 that may be determined by location detection component 130 may be shared with, provided to, or utilized in a request to service provider server 150 when determining data for events, users, or other information in proximity (e.g., with a radius, range, or geographic area) to communication device 110.

Device data components 112 may include various hardware and/or software components that may be used to detect on-device data for communication device 110 and/or nearby data within a proximity range around communication device 110 or within a geographic area associated with communication device 110. Device data components 112 may include hardware components that may be used to determine whether communication device 110 is functioning correctly or has been compromised, is damaged, or a hardware component has been added or removed. For example, device data components 112 may include a subscriber identity module (SIM) card component configured to detect if a SIM card has been removed, added, is identified and known or unknown, or has been altered or damaged. Other types of hardware components may include other on-device hardware components, such as a memory, processor, input/output (I/O) components, or other on-device components. Device data components 112 may include peripherals and/or attachable devices that may be connected through one or more ports or wired/wireless connections and whether the components are identified, suspicious, or acting maliciously (e.g., utilizing a malicious computer program or code). Device data components 112 may also include software components that may interact with the hardware components, which may also be monitored to determine whether the components are acting suspiciously or maliciously by digital wallet application 120 for imposition of a limitation when certain requirements are met. Device data components 112 may be used to determine whether communication device 110 has been powered on or off, as well as whether various components have been deactivated or activated.

In various embodiments, device data components 112 may include a camera, which corresponds to an optical device of communication device 110 enabling communication device 110 to capture or record images, including still and/or video images. Device data components 112 may correspond to a digital camera on communication device 110 (e.g., incorporated in communication device 110 such as a mobile phone's digital camera in a traditional camera orientation and/or a forward facing camera orientation that captures one or more users as they use and view a display screen of communication device 110) or associated with communication device 110 (e.g., connected to communication device 110 but not incorporated within a body or structure of communication device 110), or may more generally correspond to any device capable of capturing or recording an image, video, or other digital media data, including infrared imaging or other types imaging devices. As a digital camera, device data components 112 may include a sensor array disposed on a semiconductor substrate having a plurality of photosensitive elements configured to detect incoming light. In other embodiments, other types of electromagnetic radiation sensors may be used, including infrared sensitive sensors/elements and the like. A camera of device data components 112 may include various features, such as zoom, flash, focus correction, shutter speed controls, or other various features usable to capture one or more images or videos of the user and/or other users or objects.

Device data components 112 may include other media capture components, including a microphone to capture audio data and/or a touch element or screen that captures a biometric. A camera of microphone of device data components 112 may also be used to capture data in response to an executable process performed when limiting access to data/processes of communication device 110, for example, to capture user or environmental data when a limitation is imposed by digital wallet application 120 or other application. Device data components 112 may further include a mobile phone touch screen, tablet touch screen, and/or personal computer monitor, or other display. Device data components 112 may interface with one or more applications and/or components of communication device 110.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may include an anti-virus software program, malware detection process or software, or other type of security program that may be used to determine whether communication device 110 is in danger of being compromised, when communication device 110 has been scanned to detect system vulnerabilities, or if communication device 110 has been compromised by malicious programs or code.

Other applications 114 may also include email, texting, voice and IM applications that allow a user to send and receive emails, calls, texts, and other notifications through network 160. In various embodiments, other applications 114 may include financial applications, such as banking applications. Other applications 114 may also include other location detection applications, which may be used to determine a location for communication device 110, such as a mapping application and/or compass. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of communication device 110, such as display components capable of displaying information to users and other output components, including speakers.

Other applications 114 may include an application that interfaces with user tracking device 140 to detect a distance that a user wearing user tracking device 140, such as an owner of communication device 110, is from communication device 110, such as a pedometer, heart rate sensor, distance tracker, etc. (e.g., a FITBIT™ or similar device using a short range wireless communication with communication device 110). Other application 114 may be monitored by one or more processes of digital wallet application 120 to determine application data for communication device 110 and whether any application data requires a limitation to be implemented on digital wallet application 120 or another application. For example, other applications 114 may be monitored for system vulnerabilities, suspicious or irregular activity, and/or malicious code to determine whether a limitation of data or processes of digital wallet application 120 should be implemented.

Communication device 110 may further include database 116 stored on a transitory and/or non-transitory memory of communication device 110, which may store various applications and data and be utilized during execution of various modules of communication device 110. Database 116 may include, for example, identifiers such as operating system registry entries, cookies associated with digital wallet application 120 and/or other applications 114, identifiers associated with hardware of communication device 110, or other appropriate identifiers, such as identifiers used for payment/user/device authentication or identification, which may be communicated as identifying the user/communication device 110 to service provider server 150. Database 116 may include data detected nearby data, such as proximate data detected by communication device 110 and/or device hardware or software/application data may be stored on database 116. Additional received or determined proximate data from service provider server 150 may also be stored on database 116 for use by digital wallet application 120 when implementing limitations.

Communication device 110 includes at least one communication module 118 adapted to communicate with user tracking device 140, service provider server 150, and/or another nearby device within range of communication module 118. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications, for example, to detect nearby devices and/or request data of nearby devices from another device, such as a wireless network router.

User tracking device 140 may correspond to a device associated with communication device 110 and used by the user of communication device 110 (e.g., an owner of communication device 110), which may utilize appropriate hardware and software configured for wired and/or wireless communication with at least one of communication device 110 and/or service provider server 150. For example, user tracking device 140 may be communicatively coupled to communication device 110 through short range wireless communications. User tracking device 140 may include short range wireless communication components, which may utilize short range wireless communications to communicate with communication device 110 (e.g., over Bluetooth Low Energy, LIE Direct, WiFi, radio frequency, infrared, Bluetooth, near field communications, etc.). In other embodiments, user tracking device 140 may further include network communication components and be capable of transmitting and/or receiving information from service provider server 150. User tracking device 140 may be used to determine a distance or range that the user is from communication device 110, which may affect whether one or more limitations should be imposed on data or processes of communication device 110.

User tracking device 140 may also monitor user biometrics of the user, for example, if the user is in duress, is asleep, is awake, or is in movement. Such data may be used to determine user data that may affect implementation of a limitation on communication device 110. User tracking device 140 may therefore include a sensor or other component used to collect the information associated with the user, such as an input device, a camera, a microphone, an accelerometer, a motion detector, an environmental sensor, and/or a biometric sensor. The current information may correspond to biometric data, which may correspond to biometrics of the user (e.g., heart rate, perspiration, etc.) and/or activity (e.g., steps taken, distance travelled, exercise performed, etc.). User tracking device 140 may store the biometric activity data, or may transmit the biometric activity data on communication device 110 and/or service provider server 150 using the communication component. User tracking device 140 may include display devices, including GUI's capable of displaying information to users. User tracking device 140 may also include other output devices, including speakers. User tracking device 140 may include input devices, including touch screens. In various embodiments, user tracking device 140 may correspond to a wristwatch with appropriate computer hardware resources, eyeglasses with appropriate computer hardware (e.g. GOOGLE GLASS™), other type of wearable computing device, implantable communication devices, and/or other types of computing devices capable of transmitting and/or receiving data, such as a FITBIT™.

Service provider server 150 may be maintained, for example, by an online payment service provider, which may provide account and/or data services to communication device 110. In this regard, service provider server 150 includes one or more processing applications which may be configured to interact with communication device 110, user tracking device 140, and/or another device/server to determine and/or provide data necessary to determine and implement limitations on data or processes of communication device 110. In one example, service provider server 150 may be provided by PAYPAL®, Inc. of San Jose, Calif., USA. However, in other embodiments, service provider server 150 may be maintained by or include other types of data providers and data service aggregators, such as authority services that monitor crime, activity or event tracking services (e.g., news services, etc.), or other service providers.

Service provider server 150 may provide an API and/or DB either publically available or private that may be utilized by communication device 110 for determination of data in proximity to communication device 110. Service provider server 150 may correspond to mobile application service providers, social networking and/or microblogging platforms, messaging services, authority or crime tracking services, merchant services, or other online resources that may be utilized by communication device 110 for determination of necessary data to implement limitations on data/processes.

Service provider server 150 of FIG. 1 includes a location data application 160, a transaction processing application 152, other applications 154, a database 156, and a network interface component 158. Location data application 160, transaction processing application 152, and other applications 154 may correspond to executable processes, procedures, and/or applications with associated hardware. In other embodiments, service provider server 150 may include additional or different modules having specialized hardware and/or software as required.

Location data application 160 may correspond to one or more processes to execute modules and associated specialized hardware of service provider server 150 to determine and provide data required by communication device 110 for use in determining limitations necessary to be implemented on access to data or processes of communication device 110 based on limitation settings of communication device 110. In this regard, location data application 160 may correspond to specialized hardware and/or software to receive or determine data associated with a location, which may correspond to crime reports and/or crime statistics, users at or nearby a location, events occurring at or nearby the location including events detected at a home or business through one or more sensors and/or devices, merchant information, and/or devices at a location. For example, location data application 160 may determine and make available through a publically available API/DB, crimes reported at or nearby a location and may track crime statistics. Location data application 160 may also interface with devices at or nearby a location to detect users, events, and/or devices at the location. Location data application 160 may utilize information from such devices to determine whether any users, devices, or events are suspicious, criminal, or acting maliciously, and may also provide information about the users, devices, and events to communication device 110. Location data application 160 may further provide an online API and/or DB that is accessible by one or more applications of communication device 110 to determine and retrieve the data associated with a location, event, and/or user determined or detected by communication device 110.

In various embodiments, service provider server 150 may include a transaction processing application 152; however, other types of service providers may not necessarily include a transaction processing, account, or payment processing application. Transaction processing application 152 may correspond to one or more processes to execute software modules and associated specialized hardware of transaction processor server 140 to provide account and transaction processing services to users, for example though an account and/or payment instruments of the user. In this regard, transaction processing application 152 may correspond to specialized hardware and/or software to establish the account using user data. In order to establish a personal account to send and receive payments, transaction processing application 152 may receive information requesting establishment of the account. The information may include user personal, business, and/or financial information, or other information for an entity establishing the account (e.g., personal user, merchant, charity, etc.). Additionally the information may include a login, account name, password, PIN, or other account creation information. The user establishing the account may provide a name, address, social security number, or other personal or business information necessary to establish the account and/or effectuate payments through the account. Transaction processing application 152 may further allow the entity to service and maintain the payment account, for example, by adding and removing funding instruments. Once the shared account and/or personal account is established, transaction processing application 152 may process a transaction to transfer a value from a personal account to the shared account. Location data application 160 may be used to track biometric activity and, based on the biometric activity of a user, determine a share or portion of a value for the shared account to provide each user based on their biometric activity. Transaction processing application 152 may be used to process a transaction to withdraw the amount of the share of the value from the shared account and deposit the amount to the personal account. Additionally, transaction processing application 152 may establish one or more restrictions on use of the amount, which may be enforced during electronic transaction processing by transaction processing application 152.

In various embodiments, service provider server 150 includes other applications 154 as may be desired in particular embodiments to provide features to payment provider server 134. For example, other applications 154 may include security applications for implementing server-side security features, programmatic client applications for interfacing with appropriate application programming interfaces (APIs) over network 170, or other types of applications. Other applications 154 may contain software programs, executable by a processor, including a graphical user interface (GUI), configured to provide an interface to the user when accessing payment provider server 134, where the user or other users may interact with the GUI to more easily view and communicate information. In various embodiments, other applications 154 may include connection and/or communication applications, which may be utilized to communicate information to over network 170.

Additionally, service provider server 150 includes database 156. As previously discussed, the user may establish one or more payment accounts having a digital wallet with service provider server 150, although in certain embodiments, service provider server 150 may not provide account services. Accounts in database 156 may include user information, such as name, address, birthdate, payment instruments/funding sources, additional user financial information, user preferences, and/or other desired user data. The user may link to their respective digital wallets and/or payment accounts through an account, user, merchant, and/or device identifier. Thus, when an identifier is transmitted to service provider server 150, e.g. from communication device 110, one or more digital wallets and/or payment accounts belonging to the user may be found. Database 156 may also store location specific data, which may be provided to communication device 110 for use in determining limitations on access to processes/data based on settings of communication device 110.

In various embodiments, service provider server 150 includes at least one network interface component 158 adapted to communicate communication device 110 and/or user tracking device 140 over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2A:
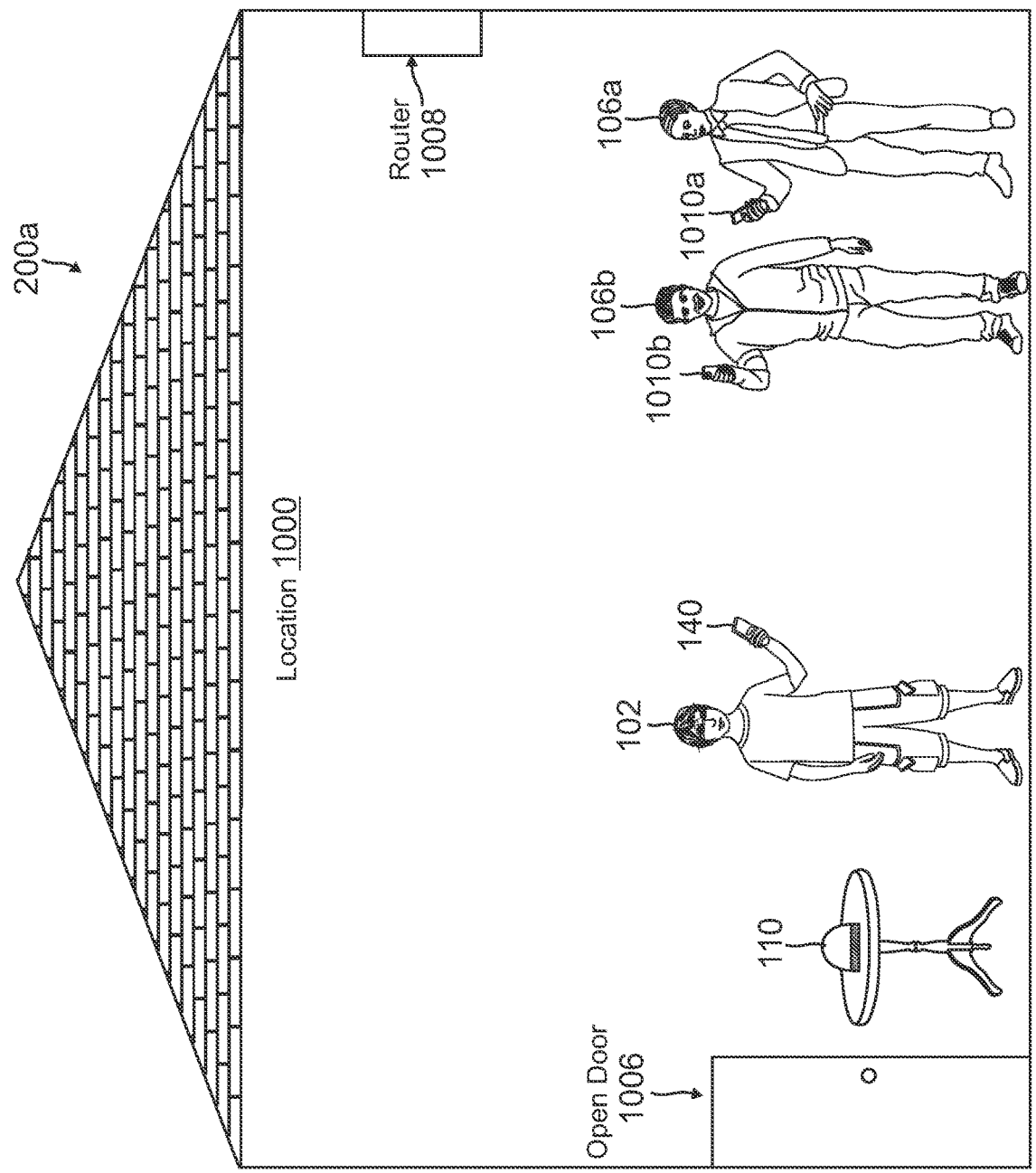
FIG. 2A is an exemplary real-world environment displaying proximate events and data that cause a device to implement limitations on device functionality and secure data, according to an embodiment.

FIG. 2A is an exemplary real-world environment displaying proximate events and data that cause a device to implement limitations on device functionality and secure data, according to an embodiment. Environment 200*a* of FIG. 2A displays multiple location-specific events, users, and/or devices that may generate data occurring in proximity to communication device 110 for an owner 102 of communication device 110. The events, users, and/or devices causing generating of the proximate data to communication device 110 may be used to determine limitations on data and/or processes of communication device 110, for example, to protect communication device 110 from unauthorized usage or fraudulent misappropriation of data. In this regard, environment 200a includes communication device 110 and user tracking device 140 having the features described in reference to system 100 of FIG. 1.

In this regard, a location 1000 may include a location of owner 102 of communication device 110, such as a home, work, or other location that owner 102 may occupy (e.g., a merchant location or other residence/business). Communication device 110 is shown within location 1000 with owner 102, and owner 102 is further shown wearing user tracking device 140. Communication device 110 may detect a distance that owner 102 is from communication device 110, for example, using RSSI, triangulation, or other distance detection process through short range wireless communications or distance tracking. Based on the distance, communication device 110 may determine whether any limitations should be implemented on communication device 110 to secure communication device 110 from unauthorized use or misappropriation of data.

An event 1002 occurs at a time 1004 within environment 200a, which may correspond to a crime, accident, or other type of event. Data for event 1002 may be tracked by another entity, such as a service provider, or may be detected using one or more components of communication device 110, such as a wireless transceiver, microphone, or camera. Communication device 110 may receive data of the event, which may trigger a limitation based on settings of communication device 110, which include settings of applications on communication device 110. Once triggered, the limitation may limit or prevent access to application data or processes, and may execute further processes, such as device notifications and/or output, data wipes, etc. Event 1002 alone may cause communication device 110 to implement a limitation, or event 1002 may be required to occur at a specific time, such as time 1004, to cause the limitation to be implemented.

Similarly, a suspicious user 104 may be located within a proximity to location 1000, and an open door 1006 may be detected at location 1000. Data for suspicious user 104 and/or open door 1006 may be detected or tracked by one or more devices and utilized by communication device 110 either separately or in conjunction (including use of time 1004) to determine whether to implement a limitation. Moreover, suspicious user 104 and/or open door 1006 may be compared to past detected data of users and/or events (e.g., times and duration of open doors, visitors, or other information), to determine whether suspicious user 104 and/or open door 1006 is irregular, has not previously occurred, or causes a risk analysis to exceed a threshold level.

Other data may also be detected and tracked in environment 200a, which may affect limitations on data and/or processes of communication device 110. For example, a router 1008 may be used to determine a number and/or identity of devices and/or users within or within a specific distance to location 1000. Router 1008 may connect with a device 1010a for a user 106a and a device 1010b for a user 106b. Communication device 110 may communicate with router 1008 to determine connected and/or nearby devices and users (e.g., devices 1010a/1010b and users 106a/106b). Communication device 110 may determine whether devices 1010a/1010b and users 106a/106b are suspicious or irregular, including at time 1004. Additionally, communication device 110 may determine whether devices 1010a/1010b and users 106a/106b exceed normal or allowable users at location 1000 at time 1004 or any time, and may implement a limitation based on one or more settings.

Figure 2B:
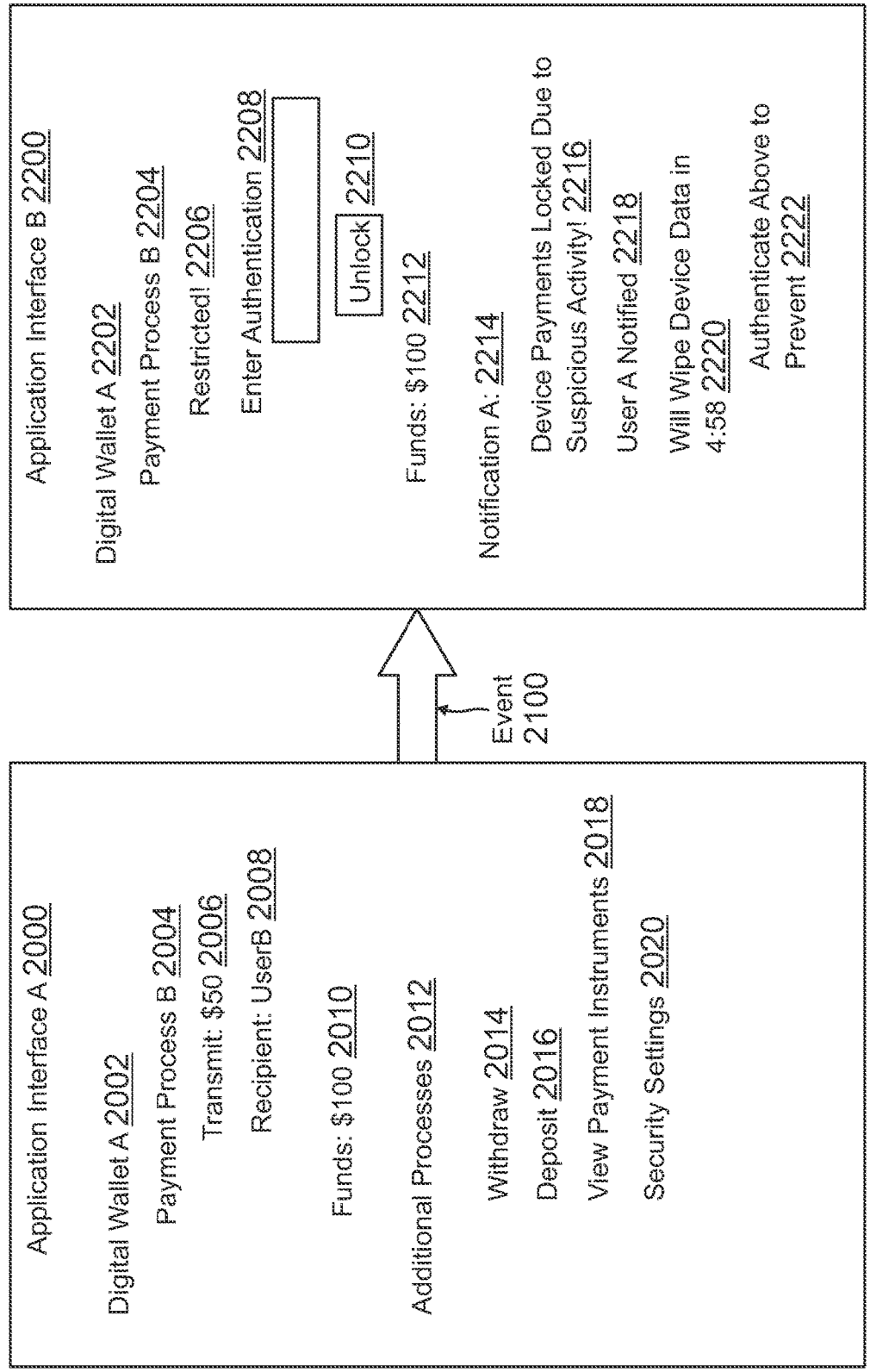
FIG. 2B is an exemplary application interface display change based on limitations imposed on a device's functionality based on events and data determined by the device, according to an embodiment.

FIG. 2B is an exemplary application interface display change based on limitations imposed on a device's functionality based on events and data determined by the device, according to an embodiment. Environment 200b of FIG. 2B includes an application interface A 2000 and an application interface B 2200 that may be output by a communication device during operation, such as communication device 110 discussed in reference to system 100 of FIG. 1. Application interface A 2000 and application interface B 2200 may be output depending on whether a limitation of data and/or processes accessible to or stored on the communication device has been implemented.

In environment 200b, application interface A 2000 includes one or more interface elements or fields that may be output and usable by a user. Application interface A 2000 is displayed when no limitations have been imposed on the data or processes available using application interface A 2000. In this regard, application interface A 2000 includes a digital wallet A 2002 that may be accessible and utilized for one or more electronic transaction processes, such as a payment process B 2004, where a user may perform a transmit money option 2006 to a recipient 2008. Additionally, digital wallet A 2002 may display funds 2010 in application interface A 2000. Application interface A 2000 may further include additional processes 2012, such as a withdraw process 2014 for digital wallet A 2002, a deposit option 2016, a process to view payment instruments 2018, and security settings 2020 to access and alter security settings 2020.

An event 2100 may occur, which may cause a limitation to be imposed on the communication device displaying application interface A 2000 and application interface B 2200. For example, the event may cause a setting's requirements for the limitation to be met or exceeded. Application interface B 2200 may therefore be restricted from access to data or limitations based on the limitation imposed on the communication device. For example, in application interface B 2200, digital wallet A 2202 may be restricted or altered from digital wallet A 2002, for example, by restricting payment process B 2204 from the processes accessible to payment process B 2004 in application interface A 2000. Application interface B 2200 includes a restricted limitation 2206 for payment process B 2204. Moreover, an authentication process 2208 may allow entry of authentication credentials that may include an unlock process 2210 for restricted limitation 2206 to remove restricted limitation 2206. However, not all data for digital wallet A 2202 may be restricted, such as funds 2212 that may still be displayed in application interface B 2200. Moreover, application interface B 2200 may further display a notification A 2214 that is displayed in application interface B 2200 based on the limitation. For example, a message 2216 alerts users that "device payments [are] locked due to suspicious activity!" Additionally, notification A 2214 may show a transmitted notification 2218 to a user A. Moreover, a wipe process time 2220 may be displayed with a wipe cancelation authentication 2222.

Figure 2C:
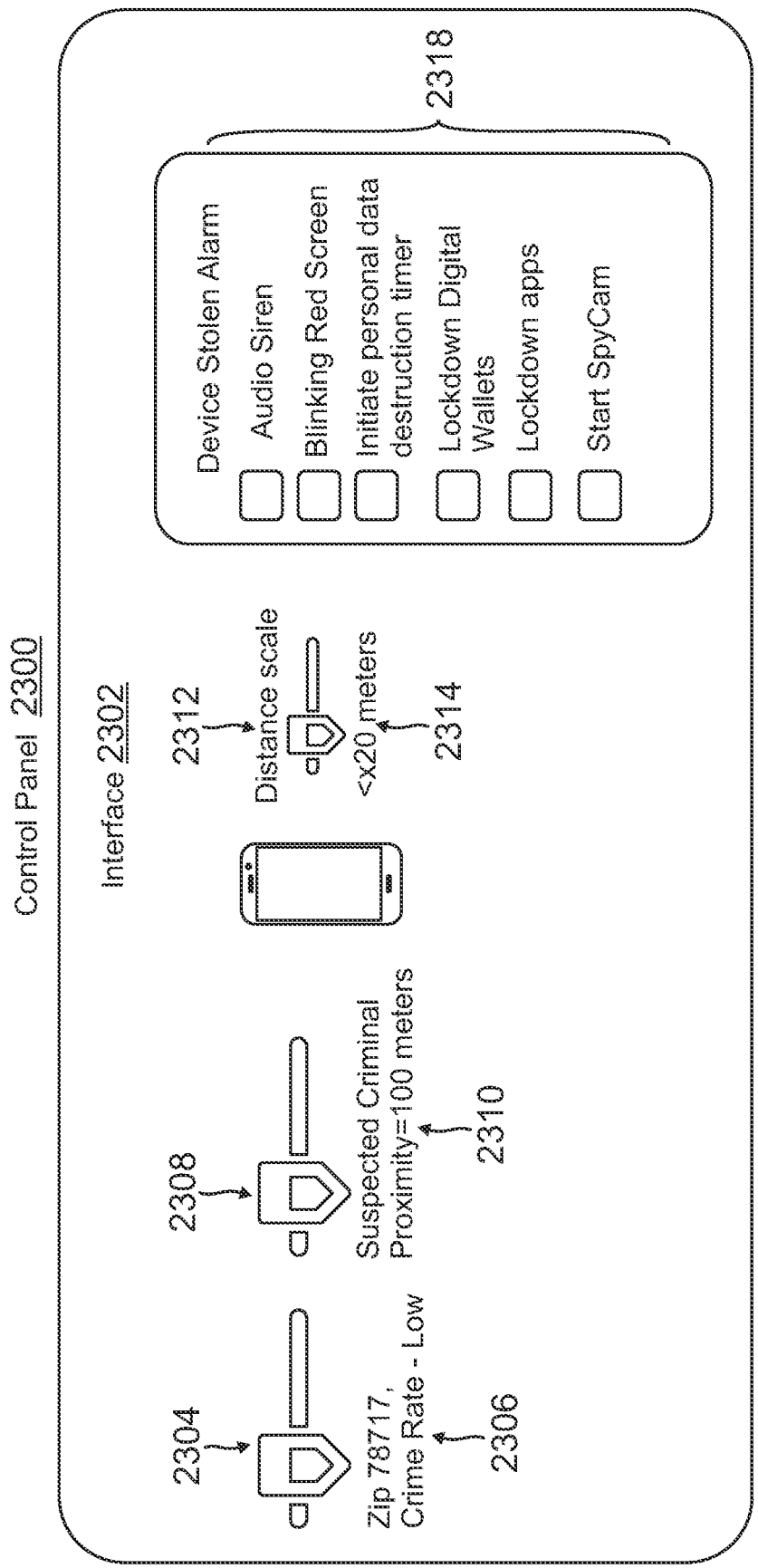
FIG. 2C is an exemplary application control panel interface to create and adjust limitation settings for a device's functionality based on events and data determined by the device, according to an embodiment.

FIG. 2C is an exemplary application control panel interface to create and adjust limitation settings for a device's functionality based on events and data determined by the device, according to an embodiment. Environment 200b of FIG. 2C includes interface 2302 that may be output by a communication device during operation, such as communication device 110 discussed in reference to system 100 of FIG. 1. Environment 200c of FIG. 2C includes an interface 2302 for a control panel 2300 that may be used to establish settings that may cause imposition of a limitation on the communication device, for example, by setting data requisites that, when met or exceeded, cause execution of a process to limit or restrict access to and/or use of data/processes of the communication device.

For example, interface 2302 of control panel 2300 first includes a crime rate configuration 2306 having a slider 2304 that sets an allowable crime rate within a proximity to a geographic region for the communication device. Slider 2304 has set the allowable crime rate to low in environment 200c. Interface 2302 further includes an allowable distance from a suspected criminal configuration 2310 having a slider 2308 that allows a minimum allowable distance between the communication device and a suspected criminal of 100 meters. Additionally, a user distance configuration 2314 has a slider 2312 that sets a maximum distance between the user and the user device at less than 20 meters. Interface 2302 of control panel 2300 may further allow for device stolen alarm settings 2316 to be established, which may be executed when a stolen device condition is satisfied, such as if the device exceeds the 20 meter limit for user distance configuration 2314. Each of options 2318 may be selected to be executed in the event of the stolen device condition, such as an audio siren, blinking colored screen, personal data destruction timer initiation, digital wallet lockdown, application location, and/or initiation and activation of a camera using an optical and/or audio capture component of the communication device.

Figure 3:
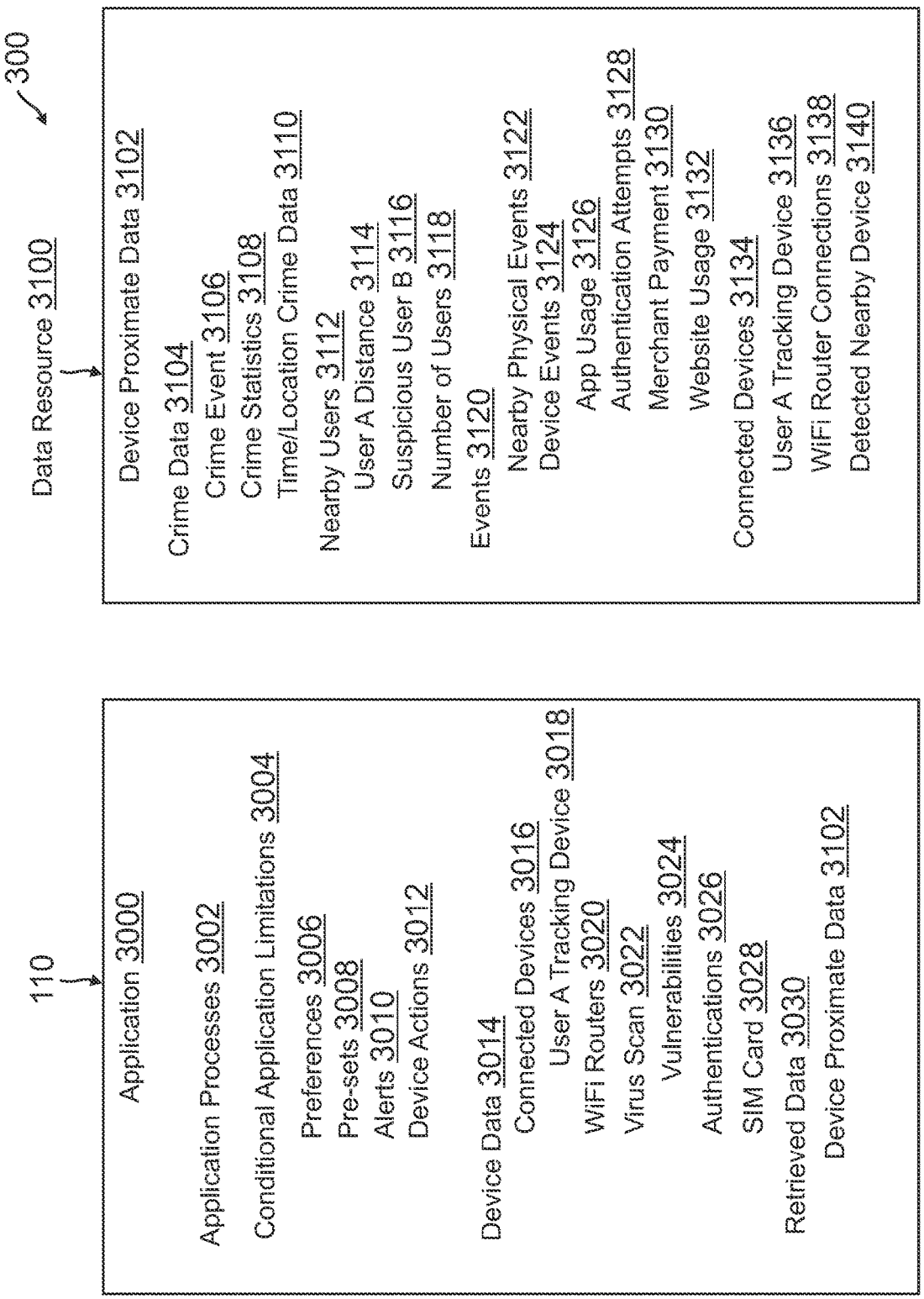
FIG. 3 is an exemplary system environment having a communication device determining device data and interacting with a data resource to determine data proximate to the device for implementing device functionality limitations, according to an embodiment.

FIG. 3 is an exemplary system environment having a communication device determining device data and interacting with a data resource to determine data proximate to the device for implementing device functionality limitations, according to an embodiment. Environment 300 of FIG. 3 includes an application 3000 that may be executed by communication device 110 discussed in reference to system 100 of FIG. 1. Moreover, FIG. 3 includes device proximate data 3102 stored by a data resource, such as service provider server 150 discussed in reference to system 100 of FIG. 1.

Communication device 110 executes application 3000, where application 3000 may correspond to digital wallet application 120 corresponding generally to the specialized hardware and/or software modules and processes described in reference to FIG. 1, or another application having similar processes to implement limitations on application 3000 or another application of communication device 110. Application 3000 may correspond to an application that has application data and/or processes that a user, such as an owner of communication device 110, would like to secure based on conditions and data detected by communication device 110 meeting or exceeding settings for limitations to secure device data/processes. In this regard, application 3000 includes application processes 3002 having application data that may be secured through conditional application limitations 3004. Conditional application limitations 3004 include various settings and/or conditions that are required to be met in order for a limitation to be implemented, including preferences 3006 for limitations, pre-sets 3008 that may correspond to preset settings and/or conditions for limitations, alerts 3010 that may be executed with a limitation, and/or device actions 3012 that may be performed with the limitation, such as a data wipe.

Conditional application limitations 3004 may be processed with device data 3014 to determine whether one or more limitations may be imposed on communication device 110. In this regard, device data 3014 may correspond to data detected by communication device 110 directly, such as proximate data and/or on-device data. Device data 3014 includes connected device 3016 to communication device 110, such as a user A tracking device 3018 that may be used to determine a distance between communication device 110 and user A, such as the owner of communication device 110. Device data 3014 may include WiFi routers 3020 that are connected or accessible to communication device 110, and may be used to determine if communication device 110 is connected to a secure network or device/application data may be accessible to potentially malicious devices. A virus scan 3022 may be used to determine when communication device 110 was last scanned, as well as any vulnerabilities 3024 of communication device 110. Authentications 3026 may include a number of successful and/or failed authentications using communication device 110. Additionally, device data 3014 may include information about a SIM card 3028, such as whether the card is identified, added, or removed. Conditional application limitations 3004 may also be processed with retrieved data 3030, which may correspond to device proximate data 3102 from data resource 3100.

Data resource 3100 includes an API and/or DB accessible by communication device 110 to retrieve device proximate data. Data resource 3100 can include device proximate data 3102 including crime data 3104, nearby users 3112, events 3120, and connected devices 3134. Crime data 3104 may include a crime event 3106 at a location associated with communication device 110, as well as crime statistics 3108 and time/location crime data 3110 for crime event 3106 and crime statistics 3108. Nearby users 3112 may include a user A distance 3114 that may be detected for user A, for example, using location tracking, other device usage, or other information that may be used to determine where user A is relative to communication device 110. Nearby users 3112 may also include suspicious user B 3116 and a number of users 3118 in proximity to communication device 110.

Events 3120 for device proximate data 3102 include nearby physical events 3122 for other physical events occurring in proximity to communication device 110, such as accidents, physical area breach by an entity, or other event that may cause implementation of a limitation of data/processes of communication device 110. Device events 3124 may also be detected, such as app usage 3126 of an application and corresponding online resource, authentication attempts 3128 on communication device 110 or using another device and an online account or service, merchant payment 3130 to a merchant using an account, and/or website usage 3132. Connected devices 3134 may also be tracked, such as user A tracking device 3136, WiFi router connections 3138, and/or a detected nearby device 3140 that may indicate malicious or suspicious events or devices.

Figure 4:
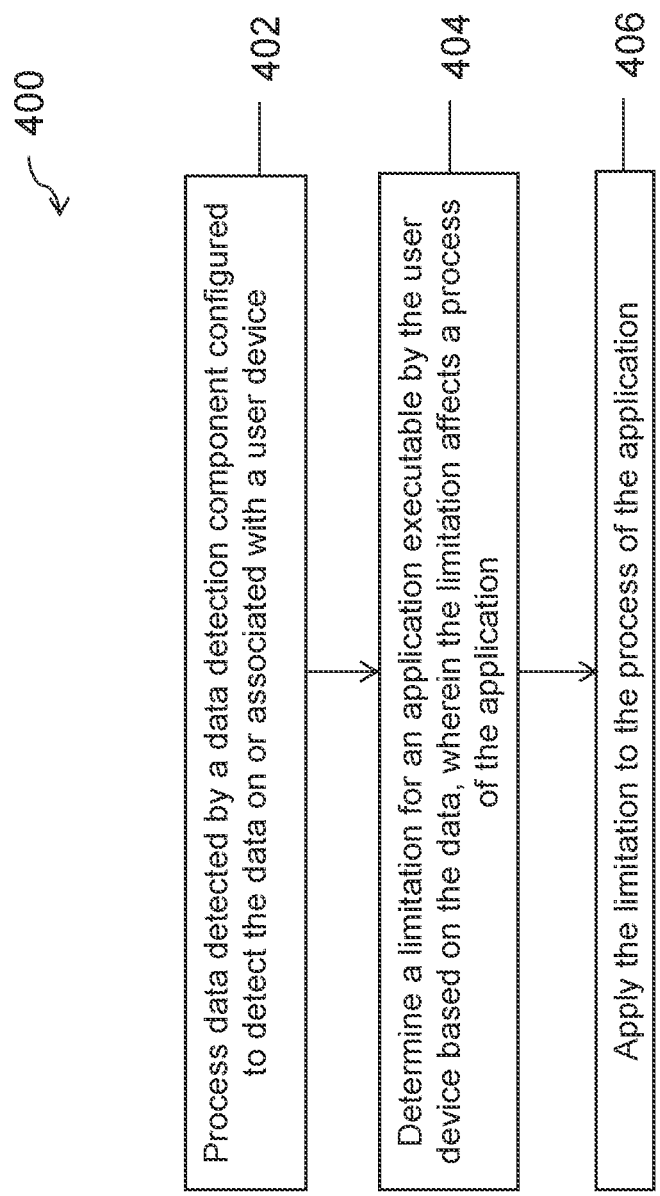
FIG. 4 is a flowchart of an exemplary process for limiting device functionality based on data detection and processing, according to an embodiment.

FIG. 4 is a flowchart of an exemplary process for limiting device functionality based on data detection and processing, according to an embodiment. Note that one or more steps, processes, and methods described herein of a flowchart 400 in FIG. 4 may be omitted, performed in a different sequence, or combined as desired or appropriate.

At step 402 of flowchart 400, data detected by a data detection component configured to detect the data on or associated with a user device system is processed. The user device system may comprise a network interface component comprising an input component and the data detection component configured to detect data on or associated with the user device system. The data may also be determined using an online resource, where the data comprises a crime report or a geographically high crime rate area.

A limitation for an application executable by the user device system is determined based on the data, wherein the limitation affects a process of the application or data access from the user device system, at step 402 of flowchart 400. The limitation may be automatically set by a service provider providing the application or data for the application, such as a digital wallet, or may be set based on a preference of a user associated with the application/application data. The limitation may impose a limit on a digital wallet utilized by the application on the user device system, and wherein the limitation imposed on the digital wallet comprises at least one of an application use limitation of the digital wallet, a spend limitation using the digital wallet in the application, a transaction partner limitation using the digital wallet in the application, or a disablement of the digital wallet in the application. A location of the user device system based on the data processed from the user device system may be determined, wherein the limitation is further based on the location. In further embodiments, location data for the user device system may be requested from the at least one of a publically available application programming interface (API) or a publically available database (DB) based on the location, wherein the limitation is further based on the location data. The location data may comprise at least one of a crime report associated with the location, an unknown person or criminal associated with the location, a geographically high crime area associated with the location, or an unscheduled activity associated with the location.

Furthermore, a location of the user device system may be determined based on the data processed from the user device system, and an event associated with the location may then be determined, wherein the event comprises one of an open door in a household, an unknown user in a household, an account activity associated with the user device system, or a distance of an owner of the user device system exceeding a maximum allowable distance, and wherein the limitation is further based on the event. A time of the event may be determined, and it may further be determined whether the time of the event is past or before a specified time for allowed events occurring within a distance to the user device system, wherein the limitation is further based on the determining whether the time of the event is past or before the specified time. A number of network connections to a wireless network router by other devices may be determined using the wireless network router, wherein the limitation is further based on the number of network connections to the wireless network router exceeding a maximum number of allowable connections to the wireless network router. Moreover, a location of an owner of the user device may be determined using a user tracking device associated with the owner of the user device system, wherein the limitation is further based on the location. Device data for the user device system may be determined, wherein the device data comprises operational vulnerabilities of the user device system, wherein the limitation is further based on the device data. The device data may comprise at least one of a virus scan report for a virus scan of the user device system, a time since the virus scan, an added component to the user device system, a compromised component of the user device system, a compromised application of the user device system, or an authentication failure of a user using the user device system.

At step 402 of flowchart 400, the limitation is applied to the process or data of the application. In certain embodiments, the limitation may correspond to or further include a risk avoidance process that comprises a wipe process to remove at least one of confidential data from the device, application data from the device, or personal data from the device. The risk avoidance process may be processed in response to at least one of a subscriber identity module (SIM) card removal from the device or multiple unsuccessful authentication attempts of a user using the device. Additionally, an alert of the wipe process may be provided on at least one of the device or another device associated with the device, wherein the alert comprises a cancelation process to stop the wipe process. An upload of the at least one of the confidential data, the application data, or the personal data may be performed to a cloud resource prior to the wipe process. The limitation may be imposed for at least one of a length of time or based on a maximum use allowance rule. In such embodiments, an authentication process to remove the limitation using authentication credentials may also be provided. Moreover, another device may be alerted of the applying the limitation, a notification and a sound associated with the limitation, may be output, and/or a camera may be utilized to capture at least one image of a user currently using the user device system.

Figure 5:
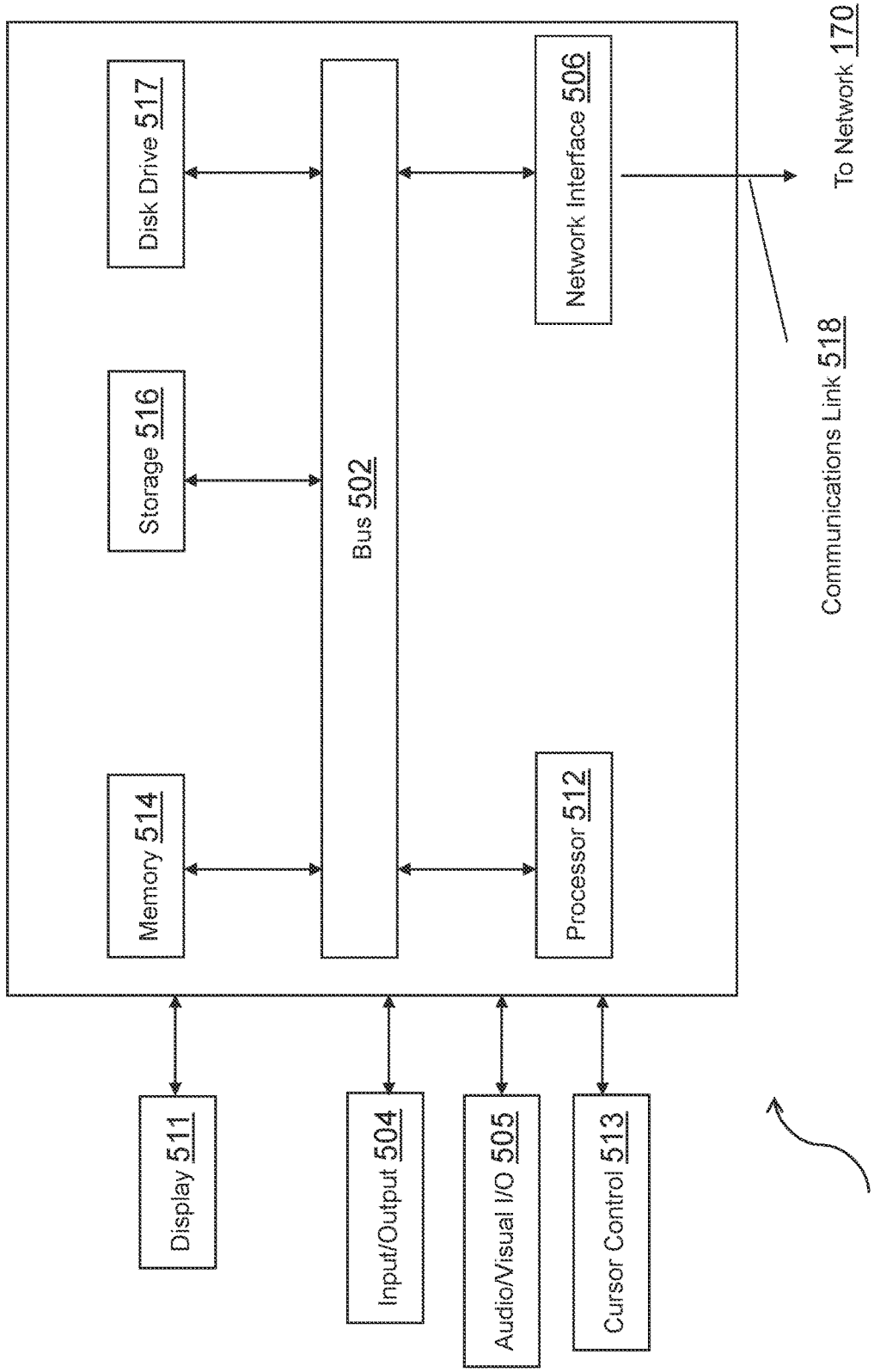
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
one or more processors; and
one or more machine-readable storage media having instructions stored thereon that, in response to being executed by the one or more processors, cause the system to perform operations comprising:
monitoring, by a data detection component, data associated with a user device;
determining that the data associated with the user device includes a risk of a fraudulent misuse of a digital wallet through an application on the user device;
analyzing the risk to determine a limitation on the user device, wherein the limitation is associated with an accessibility to the digital wallet via the application during a time period associated with potential device activities causing the fraudulent misuse;
limiting a funding amount available for use with the digital wallet of the user device in the application for the time period based in part of the risk analyzed; and
determining, based on further monitoring the data during the time period, whether to reduce the limitation prior to an expiration of the time period.

2. The system of claim 1, wherein the limiting can include a complete limitation without access to the funding amount in the digital wallet.

3. The system of claim 1, wherein the data associated with the device includes at least one of proximate data to the device and contextual data associated to the device in real-time.

4. The system of claim 3, wherein the proximate data is determined using an application programming interface.

5. The system of claim 1, wherein the operations further comprise:
restricting the user device functionality based in part on the data associated with the user device.

6. The system of claim 5, wherein the restricted device functionality includes limiting access to sensitive information on the user device, and wherein the limiting access includes an authentication credential.

7. The system of claim 5, wherein the restricted device functionality includes power off the device in a given location.

8. The system of claim 1, wherein the operations further comprise:
detecting an irregular use of an application of the user device;
restricting user device functionality based in part on the data associated with the user device.

9. The system of claim 1, wherein the operations further comprise:
determining that the risk is no longer present at the user device based on at least one of a change in a location of the user device of the expiration of the time period; and
reversing the limitation implemented on the user device.

10. A method comprising:
monitoring, by a data detection component, data associated with a user device;
determining that the data associated with the user device includes a risk of a fraudulent misuse of a digital wallet through an application on the user device;
analyzing the risk to determine a limitation on the user device, wherein the limitation is associated with an accessibility to the digital wallet via the application during a time period associated with potential device activities causing the fraudulent misuse;

limiting a funding amount available for use with the digital wallet of the user device in the application for the time period based in part of the risk analyzed; and determining, based on further monitoring the data during the time period, whether to end the limitation prior to an expiration of the time period.

11. The method of claim 10, wherein the determining the risk includes an event associated with the user device.

12. The method of claim 10, wherein the limiting can include a complete limitation without access to the funding amount in the digital wallet.

13. The method of claim 10, wherein the data associated with the device includes at least one of proximate data to the device and contextual data associated to the device in real-time.

14. The method of claim 13, wherein the proximate data is determined using an application programming interface.

15. The method of claim 10, further comprising:

restricting the user device functionality based in part on the data associated with the user device.

16. The method of claim 15, wherein the restricted device functionality includes limiting access to sensitive information on the user device, and wherein the limiting access includes an authentication credential.

17. A non-transitory machine-readable medium having stored thereon machine-readable instructions executable to cause a machine to perform operations comprising:

monitoring, by a data detection component, data associated with a user device;

determining that the data associated with the user device includes a risk of a fraudulent misuse of a digital wallet through an application on the user device;

analyzing the risk to determine a limitation on the user device, wherein the limitation is associated with an accessibility to the digital wallet via the application during a time period associated with potential device activities causing the fraudulent misuse;

limiting a funding amount available for use with the digital wallet of the user device in the application for the time period based in part of the risk analyzed; and determining, based on further monitoring the data during the time period, whether to change the limitation prior to an expiration of the time period.

18. The non-transitory machine-readable medium of claim 17, wherein the determining the risk includes an event associated with the user device.

19. The non-transitory machine-readable medium of claim 17, wherein the limiting can include a complete limitation without access to the funding amount in the digital wallet.

20. The non-transitory machine-readable medium of claim 17, wherein the operations further comprise:

restricting the user device functionality based in part on the data associated with the user device, and wherein the restricted device functionality includes powering off the device in a given location.

* * * * *